(12) United States Patent
Goodman et al.

(10) Patent No.: US 7,233,568 B2
(45) Date of Patent: Jun. 19, 2007

(54) SYSTEM AND METHOD FOR SELECTION OF REDUNDANT CONTROL PATH LINKS IN A MULTI-SHELF NETWORK ELEMENT

(75) Inventors: Kevin Goodman, Nepean (CA); Jude Binette, Orleans (CA); Jean Labonte, Aylmer (CA); Joseph Soetemans, Nepean (CA)

(73) Assignee: Alcatel Canada Inc., Kanata (CA)

( * ) Notice: Subject to any disclaimer, the term of this patent is extended or adjusted under 35 U.S.C. 154(b) by 761 days.

(21) Appl. No.: 10/012,432

(22) Filed: Dec. 12, 2001

(65) Prior Publication Data

US 2003/0058800 A1   Mar. 27, 2003

(30) Foreign Application Priority Data

Sep. 27, 2001   (CA) .................................... 2358038

(51) Int. Cl.
*G06F 11/00* (2006.01)
*H04B 1/56* (2006.01)
*H04J 1/16* (2006.01)

(52) U.S. Cl. ...................... 370/218; 370/228; 370/252; 370/389; 370/241

(58) Field of Classification Search ................ 370/218, 370/252, 225–228, 230.1, 351, 360; 714/4
See application file for complete search history.

(56) References Cited

U.S. PATENT DOCUMENTS

| | | | | |
|---|---|---|---|---|
| 4,847,837 A * | 7/1989 | Morales et al. | ................. | 714/4 |
| 5,042,027 A * | 8/1991 | Takase et al. | ................ | 370/252 |
| 5,130,974 A * | 7/1992 | Kawamura et al. | .......... | 370/217 |
| 5,200,949 A * | 4/1993 | Kobayashi | ................... | 370/228 |
| 5,574,718 A * | 11/1996 | Eckhoff et al. | .............. | 370/228 |
| 6,023,452 A * | 2/2000 | Shiragaki | ..................... | 370/227 |
| 6,687,231 B1 * | 2/2004 | Czerwiec et al. | ........... | 370/244 |

* cited by examiner

*Primary Examiner*—Afsar Qureshi
(74) *Attorney, Agent, or Firm*—McCarthy Tetrault LLP

(57) ABSTRACT

A system for selecting an active control path link as a communication link between a control shelf and a controlled shelf in a multi-shelf network element is provided. The system includes a first and a second control path links connecting the control shelf to the controlled shelf. The system also includes an assessment module adapted to assess health of transmissions sent through each of the first and the second control path link and a selection module associated with the assessment module. The selection module is adapted to select the active control path link as either of the first and the second control path link utilizing a health report relating to the first and the second control path link generated by the assessment module.

26 Claims, 7 Drawing Sheets

| ERROR# | FAULT CONDITION | DESCRIPTION | DEMERITS |
|---|---|---|---|
| 601 | SHELF NUMBER NOT ASSIGNED | THIS IS DERIVED FROM THE SHELF NUMBERING PROCESS. IT MEANS ONE OF TWO THINGS: 1)THE CSL IS MISCABLED OR 2)CANNOT GET A SHELF NUMBER. | 3000 |
| 602 | CSL DOWN | THE CSL STATUS IS CURRENTLY DOWN. THE STATUS OF THE CSL IS MONITORED BY THE CSL TASK. WHEN THECSL STATUS CHANGES, THE CSL REDUNDANCY TASK IS INFORMED. | 1500 |
| 603 | ACTIVE CONTROL CARD UNREACH-ABLE | THE SHELF CONTROLLER CANNOT COMMUNICATE WITH THE ACTIVE CONTROL CARD. | 750 |
| 604 | E1 ERRORED | THE QUALITY OF THE E1 CHANNEL HAS PASSED A SPECIFIC THRESHOLD. THE CSL TASK MONITORS THE QUALITY OF THE E1 CHANNEL OF BOTH CSLS. WHEN THE QUALITY OF THE E1 CHANNEL CHANGES, THE CSL REDUNDANCY TASK IS INFORMED. | 300 |
| 605 | ETHERNET ERRORED | THE QUALITY OF THE ETHERNET CHANNEL HAS PASSED A SPECIFIC THRESHOLD. THE CSL TASK MONITORS THE QUALITY OF THE ETHERNET CHANNEL OF BOTH CSLS. WHEN THE QUALITY OF THE ETHERNET CHANNEL CHANGES, THE CSL REDUNDANCY TASK IS INFORMED. | 150 |
| 606 | CSL LOCKED OUT | THERE IS A LOCKOUT ON THE CSL. A LOCKOUT ON A CSL IS JUST A SUGGESTION TO MOVE AWAY FROM A SPECIFIC CSL, IF POSSIBLE. | 100 |
| 607 | RTS FAILURE | THE RTS HAS FAILED. THE RTS DRIVER MONITORS THE STATUS OF THE RTS CHANNEL AND NOTIFIES THE CSL REDUND-ANCY TASK WHEN THE STATUS CHANGES. | 10 |
| 608 | INACTIVE CONTROL CARD UNREACH-ABLE | THE SHELF CONTROLLER CANNOT COMMUNICATE WITH THE INACTIVE CONTROL CARD. | 5 |

TABLE 600

FIG. 6A

| ERROR# | FAILURE DESCRIPTION | DEMERITS |
|---|---|---|
| 660 | THE MATE SHELF CONTROLLER IS MISSING. DEMERITS RAISED AGAINST MATE. | 30000 |
| 661 | THE SHELF CONTROLLER IS UNABLE TO COMMUNICATE WITH THE MATE SHELF CONTROLLER ALTHOUGH THE MATE SHELF CONTROLLER IS PRESENT. DEMERITS RAISED AGAINST MATE. | 28000 |
| 662 | THE INACTIVE SHELF CONTROLLER HAS NOT RECONCILED ITS CONFIGURATION INFORMATION WITH THE MATE SHELF CONTROLLER. *THESE DEMERITS WILL ONLY OCCUR ON THE INACTIVE SHELF CONTROLLER.* | 25000 |
| 663 | A RECONCILE IS IN PROGRESS BETWEEN THE SHELF CONTROLLERS. *THESE DEMERITS WILL ONLY OCCUR ON THE INACTIVE SHELF CONTROLLER.* | 25000 |
| 664 | A SHELF NUMBER HAS NOT HET BEEN ASSIGNED OR REFUSED TO THE SHELF CONTROLLER. | 6000 |
| 665 | THE INACTIVE SHELF CONTROLLER HAS A DIFFERENT SLOT ID THAN THE ACTIVE DUE TO A MISCABLED SUB-SHELF. *THESE DEMERITS WILL ONLY OCCUR ON THE INACTIVE SHELF CONTROLLER.* | 3500 |
| 666 | THE CSL BETWEEN THE SHELF CONTROLLER AND THE CONTROL COMPLEX IS DOWN. | 3000 |
| 667 | THE SHELF CONTROLLER IS UNABLE TO COMMUNICATE WITH A SUB-SHELF DUE TO A CABLE PORBLEM (i.e. CABLE MISSING OR SHELF CONTROLLER A IS CABLED TO CONNECTOR B, ETC.). CAN BE ANY NUMBER OF UNREACHABLE SUB-SHELVES. | 2500 |
| 668 | THE CSL IS UP, BUT THE SHELF CONTROLLER CAN NOT COMMUNICATE WITH THE ACTIVE CONTROL COMPLEX. THE INACTIVE SHELF CONTROLLER WITLL RAISE THE DEMERITS BEFORE THE ACTIVE SHELF CONTROLLER IF THE FAILURE IS COMMON TO BOTH SHELF CONTROLLERS. | 1500 |
| 669 | THE CSL IS UP, BUT THE E1 CHANNEL HAS QUALITY PROBLEMS. | 750 |
| 670 | THE CSL IS UP, BUT THE ETHERNET CHANNEL HAS QUALITY PROBLEMS. | 400 |
| 671 | THE RECONCILE BETWEEN THE SHELF CONTROLLERS HAS BEEN ATTEMPTED AND FAILED. *THESE DEMERITS WILL ONLY OCCUR ON THE INACTIVE SHELF CONTROLLER.* | 375 |
| 672 | TWO OR MORE FABRIC INTERFACE CARDS ARE UNREACHABLE FROM THE SHELF CONTROLLER. | 350 |
| 673 | TWO OR MORE LINE CARDS ARE UNREACHABLE FROM THE SHELF CONTROLLER. | 300 |
| 674 | WHEN THE CONTROL COMPLEX WANTS THE MOVE ALL CSL CONNECTIVITY TO ONE ICON CARD (i.e. ONE ICON IS "LOCKED OUT".) | 250 |
| 675 | A DIAGNOSTIC FAILURE HAS OCCURRED. THE SPECIFIC FAILURE IS INDICATED IN THE NMTI TEXT. | 10 |
| 676 | THE CSL IS UP, BUT SHELF CONTROLLER CAN NOT COMMUNICATE WITH THE INACTIVE CONTROL COMPLEX. THE INACTIVE SHELF CONTROLLER WILL RAISE THE DEMERITS BEFORE THE ACTIVE SHELF CONTROLLER IF THE FAILURE IS COMMON TO BOTH SHELF CONTROLLERS. | 5 |

TABLE 650

FIG. 6B

SYSTEM AND METHOD FOR SELECTION OF REDUNDANT CONTROL PATH LINKS IN A MULTI-SHELF NETWORK ELEMENT

FIELD OF THE INVENTION

The invention relates to a system and method for selection of redundant control path links in a multi-shelf network element.

BACKGROUND OF INVENTION

Many communication switch and router systems architecture provide redundant communication capabilities. Marconi plc, London, England has announced a redundant system under its BXR 48000 router (trade-mark of Marconi plc).

Prior art systems provide link redundancy in a network element. However, there is no mechanism in the prior art for testing the integrity of control links and the integrity of only control data in a network element. Prior art systems providing link redundancy do not provide a method of switching away from a link because of control path errors without affecting the data path and vice versa.

Further, prior art redundancy systems often do not enable switching between links without switching between control cards.

There is a need for a system and method providing control path switching redundancy that improves upon the prior art systems.

SUMMARY OF INVENTION

In a first aspect, a system for selecting an active control path link as a communication link between a control shelf and a controlled shelf in a multi-shelf network element is provided. The system includes a first and a second control path link connecting the control shelf to the controlled shelf. The system also includes an assessment module adapted to assess health of transmissions sent through each of the first and the second control path links and a selection module associated with the assessment module. The selection module is adapted to select the active control path link as either of the first and the second control path link utilizing a health report relating to the first and the second control path link generated by the assessment module.

The system may also include an error monitoring module adapted to detect control path link transmission errors on the first and the second control path links and to report the control path link transmission errors to the assessment system.

The selection module may be located in a shelf controller of the network element.

The system may also include a first shelf controller connected to the first control path link and a second shelf controller connected to the second control path link. The error monitoring module is adapted to detect shelf controller transmission errors on the first and the second shelf controllers and to report the shelf controller transmission errors to the assessment system.

The selection module may include the first and the second shelf controllers.

In a second aspect, a method for selecting an active control path link as a communication link between a control shelf and a controlled shelf in a multi-shelf network element is provided. The method includes the steps of detecting errors transmitted on each of the first and a second control path links and assessing health of transmissions sent through each of the first and a second control path links based on the errors detected. The method also includes the step of selecting a control path link from the first and a second control path links as the active control path link utilizing a health report relating to the health of transmissions of the first and the second control path links In a third aspect, a multi-shelf network element with redundant control path links is provided. The network element includes a control shelf and a controlled shelf of the network element. The network element also includes a first and a second control path links connecting the control shelf with the controlled shelf. The network element also includes an assessment module communicating with the first and the second control path. The assessment module assesses health of transmissions on the first and the second control path links and the network element selects an active control path link from the first and the second control path links based on the health of the first and the second control path links and transmits control path data over the active control path link selected.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 6A is a table depicting demerits assigned for specific errors for the switching shelf of FIG. 3; and FIG. 6B is a table depicting demerits assigned for specific errors for an I/O shelf of FIG. 3.

DETAILED DESCRIPTION OF THE EMBODIMENTS

Figure 1:
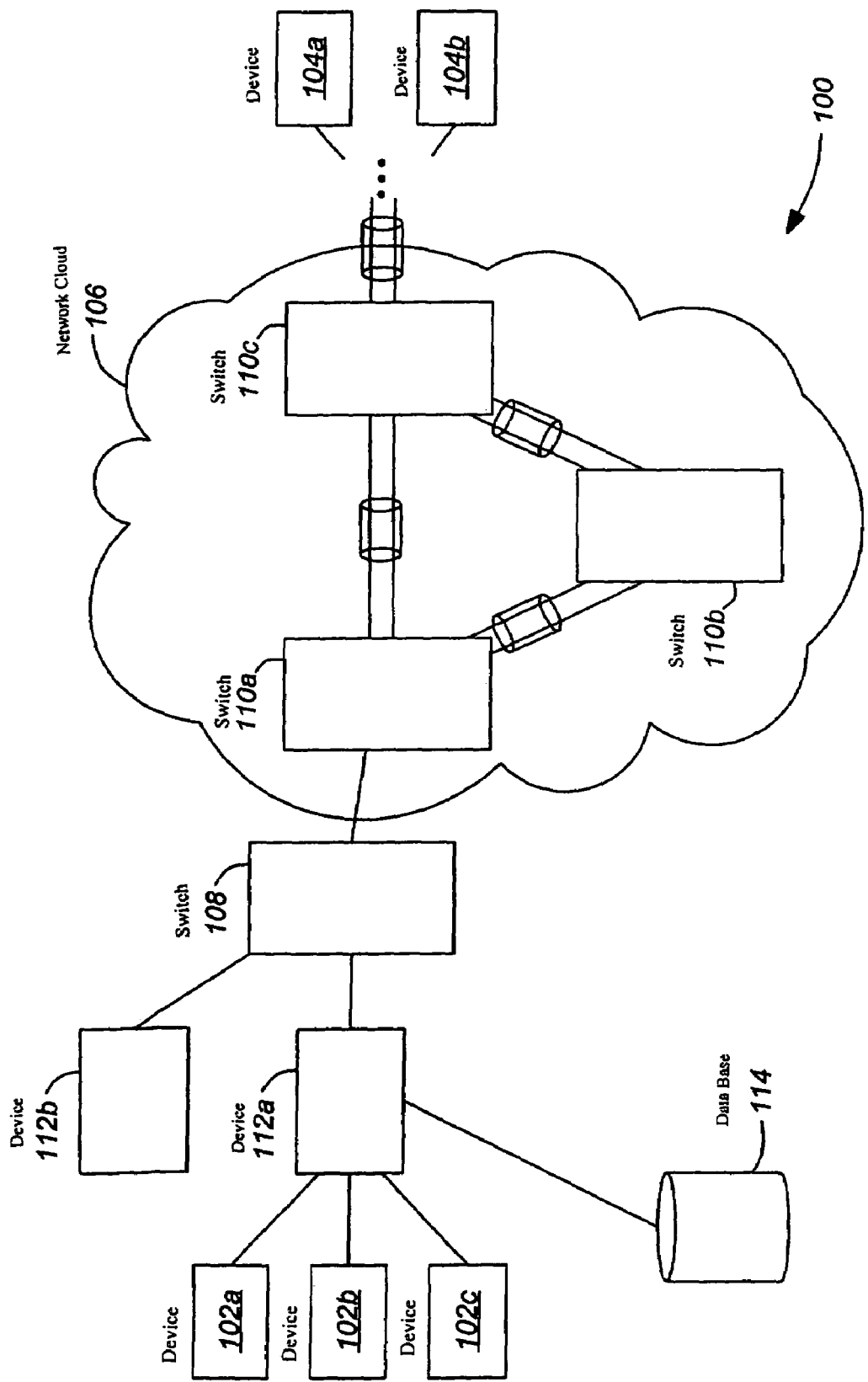
FIG. 1 is a block diagram of a communication network, utilizing a switch platform which integrates the system and method of selecting control path links embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

1.0 Basic Features of System

The embodiment provides activity switch control functions on a control plane which is separate and independent of data switching functions on a data plane. Separation of the control plane and data plane in accordance with the embodiment allows a robust, distributed architecture of control and data elements, capable of providing redundancy both within the data plane and within the control plane. Furthermore, the separate and independent control plane and a switching system implemented in hardware allows improved fabric activity switchover times in comparison to prior art software-based switching systems.

2.0 System Architecture

The following is a description of a network associated with the switch associated with the embodiment.

Referring to FIG. 1, a communication network 100 is shown. Network 100 allows devices 102A, 102B, and 102C to communicate with devices 104A and 104B through network cloud 106. At the edge of network cloud 106, switch 108 is the connection point for devices 102A, 102B and 102C to network cloud 106. In network cloud 106, a plurality of switches 110A, 110B and 110C are connected forming the communications backbone of network cloud 106. In turn, connections from network cloud 106 connect to devices 104A and 104B. Network 100 may also include devices 112a. 112b and data storage device 114. It will be appreciated that in other embodiments devices in a network may be added or deleted, and devices and their functions may be interchangeable.

Switch 108 incorporates the redundant switch fabric architecture of the embodiment. It will be appreciated that terms such as "routing switch", "communication switch", "communication device", "switch", "network element" and other terms known in the art may be used to describe switch 108. Further, while the embodiment is described for switch 108, it will be appreciated that the system and method described herein may be adapted to any switching system, including switches 110A, 110B and 110C.

Figure 2:
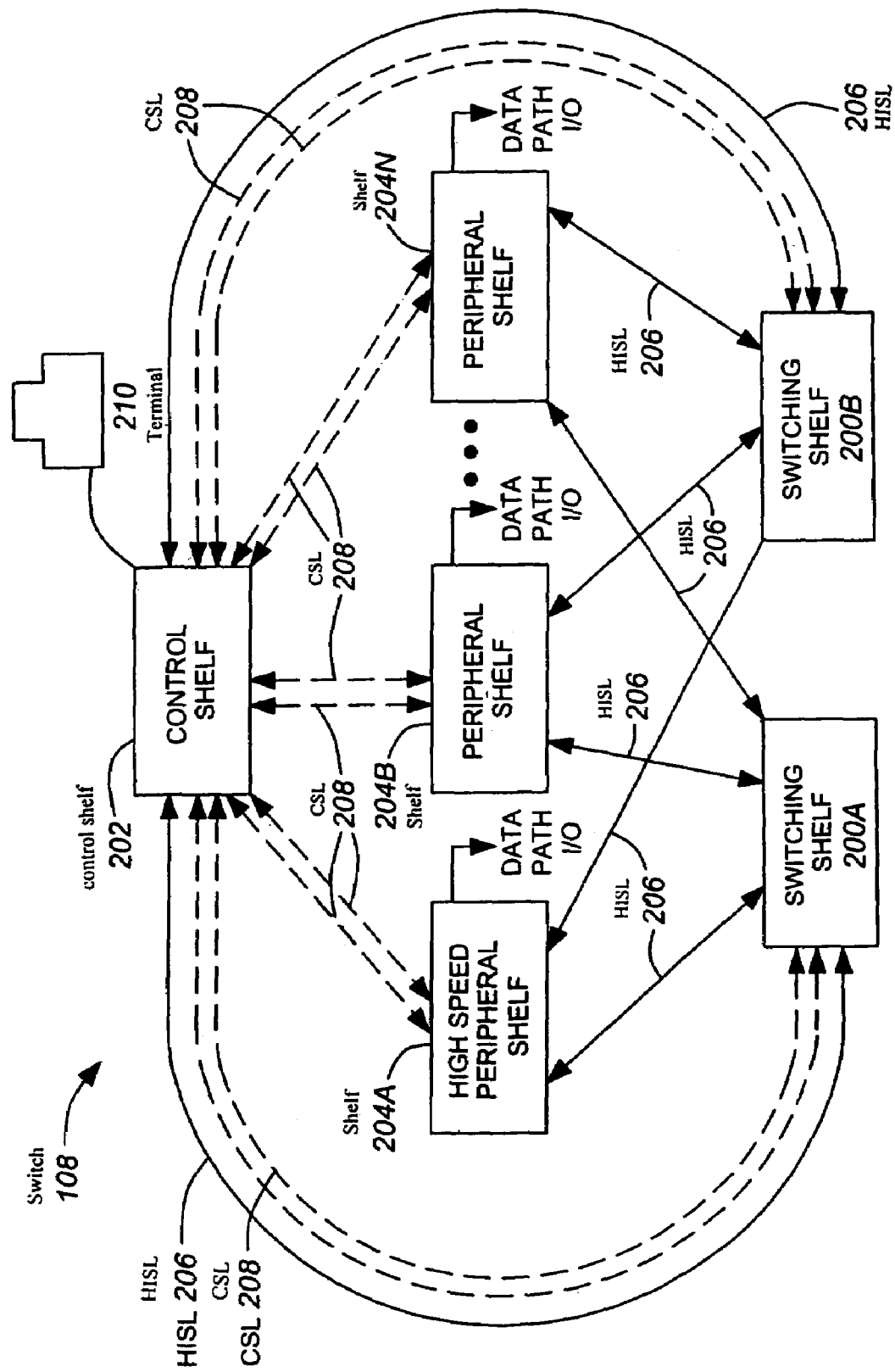
FIG. 2 is a block diagram of components and connections of the switch of FIG. 1.

Referring to FIG. 2, switch 108 is a multi-shelf, multi-protocol backbone system, which can process and transmit both ATM cells and IP traffic through its same switching fabric. In the present embodiment, switch 108 allows scaling of the switching fabric capacity by the insertion of additional shelves or cards into switch 108.

Switch 108 is a multi-shelf switching system enabling a high degree of re-use of single shelf technologies. Switch 108 comprises two switching shelves 200A and 200B, control shelf 202 residing on an I/O shelf and additional I/O shelves 204A . . . 204N (providing a total of 15 I/O shelves), and the various shelves and components in switch 108 communicate with each other through data links. Switching shelves 200A and 200B provide cell switching capacity for switch 108. I/O shelves 204 and control shelf 202 provide I/O for switch 108, allowing connection of devices, like customer premise equipment (CPEs), to switch 108. Control shelf 202 is located on a separate I/O shelf with control cards, which provides central management for switch 108.

Communication links enable switching shelves 200, I/O shelves 204 and control shelf 202 to communicate data and status information with each other. High Speed Inter Shelf Links (HISL) 206 and Control Service Links (CSLs) 208 link control shelf 202 with switching shelves 200A and 200B. HISLs 206 also link switching shelves 200 with I/O shelves 204. CSLs 208 link control shelf 202 on its I/O shelf with other I/O shelves 204A . . . 204N.

Terminal 210 is connected to switch 108 and runs controlling software i.e. network management software, which allows an operator to modify, and control the operation of, switch 108.

Figure 3:
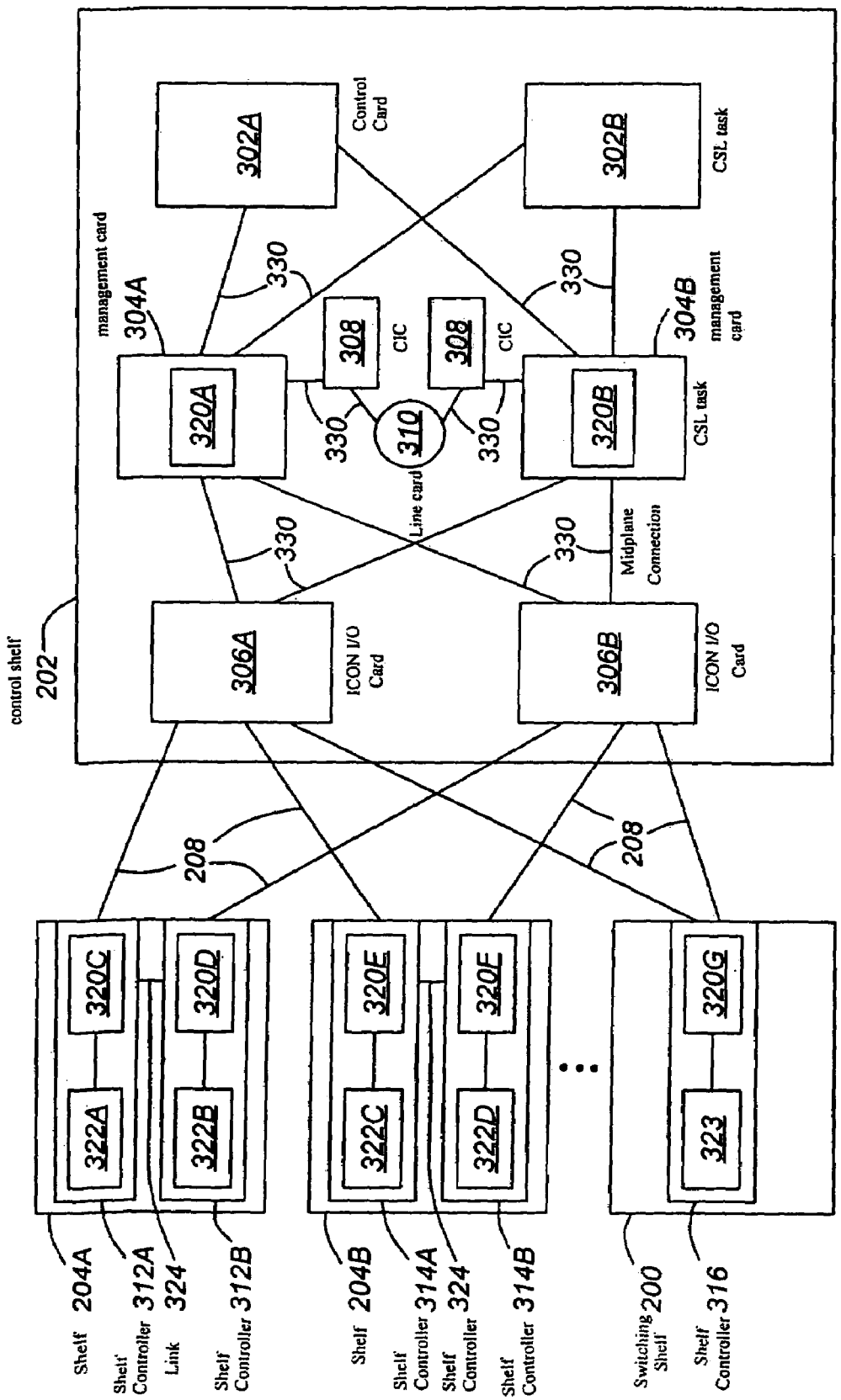
FIG. 3 is a block diagram of control path connections of the components of the switch of FIG. 2.

Referring to FIG. 3, control shelf 202 comprises an overall pair of redundant control cards 302A and 302B, a pair of interconnection (ICON) management cards 304A and 304B, a pair of ICON I/O cards 306A and 306B, a pair of ICON I/O expansion cards (not shown), a Control Interconnect Card (CIC card) 308 for each control card 302 and line cards 310. ICON I/O expansion cards are used if switch 108 has more than six I/O shelves 204 allowing eight additional I/O shelves 204 to be added to switch 108. In the description which follows, ICON I/O expansion cards are not shown and all connections are shown from I/O shelves 204 and switching shelves 200 to control shelf 202 through ICON I/O cards 306A and 306B. I/O shelves 204 comprise two shelf controllers, I/O shelf 204A having shelf controllers 312A and 312B and I/O shelf 204B having shelf controllers 314A and 314B. Switching shelves 200 each comprise one shelf controller 316.

Of control cards 302A and 302B, one control card 302 is active in control shelf 202. Active control card, illustrated in FIG. 3 by control card 302A, communicates control path data with shelf controllers 312A, 312B, 314A and 314B on I/O shelves 204 and switching shelf controllers 316 on switching shelves 200 to manage operation of routing switch 108. Control card 302B is redundant and operates as a backup to control card 302A. Both control cards 302A and 302B communicate control path data with ICON management cards 304A and 304B. In the embodiment, ICON management cards 304A and 304B operate independently of one another rather than operating in an active/inactive pair. Both ICON management cards 304A and 304B communicate control path data with both ICON I/O cards 306A and 306B but each ICON management card 304 manages specific hardware on ICON I/O cards 306A and 306B. ICON management cards 304 operate to route the control path data and commands through the appropriate ICON I/O card 306 and CSL 208 to communicate with the appropriate shelf controller. ICON I/O cards 306A and 306B together interconnect control shelf 202 to all shelf controllers 312A, 312B, 314A, 314B and 316 on other I/O shelves 204 and switching shelves 200 in switch 108 using CSLs 208.

CICs 308, connected to ICON management cards 304A and 304B, provide craft interfaces to communicate with control cards 302A and 302B. Line cards 310 are connected to CICs 308. Line cards provide ingress for the data path into switch 108 and egress for the data path out of switch 108. Connections within control shelf 202 are made using midplane connections 330.

There are two types of I/O shelves which may be connected to control shelf 202. The first type of I/O shelf is a peripheral shelf. The peripheral shelf, illustrated by I/O shelf 204A, contains I/O cards, Line Processing Cards (LPC), Peripheral Fabric Interface Cards (PFIC) and Peripheral Interconnect Cards (PIC) (not shown). I/O shelf 204A also has two shelf controllers 312A and 312B. Shelf controllers 312A and 312B are connected to the PICs using a midplane connection. PICs are then connected to CSLs 208 to communicate control plane data with the rest of switch 108. Shelf controller 312A is connected to active control card 302A through a PIC, CSL 208, ICON I/O card 306A and one of ICON management cards 304A or 304B. Since each ICON management card 304 controls specific hardware on ICON I/O cards 306, which ICON management card 304 communicates with shelf controller 312A depends on which port of ICON I/O card 306A it corresponding CSL 208 is connected. For the description of the embodiment, shelf controller 312A communicates with ICON management card 304A. Shelf controller 312B is connected to active control card 302A through a PIC, CSL 208, ICON I/O card 306B and one of ICON management cards 304A or 304B. Since shelf controller 312A communicates with ICON management card 304A, switch 108 is configured so that shelf controller 312B communicates with its pair, ICON management card 304B. Shelf controllers 312A and 312B are also connected to one another by mate link 324. Mate link 324 facilitates communication between shelf controllers 312A and 312B within I/O shelf 204A.

The second type of I/O shelf is a High Speed Peripheral Shelf (HSPS), represented as I/O shelf 204B. I/O shelf 204B contains High Speed Line Processing Cards (HLPC), I/O cards, High Speed Fabric Interface Cards (HFICs) (not shown) and two redundant high speed shelf controllers 314A and 314B. Shelf controllers 314A and 314B are directly connected to CSLs 208 to communicate control plane data with the rest of switch 108. Shelf controller 314A is connected to active control card 302A through CSL 208, ICON I/O card 306A and one of ICON management cards 304A or 304B. Since each ICON management card 304 controls specific hardware on ICON I/O cards 306, which ICON management card 304 communicates with shelf controller 314A depends on which port of ICON I/O card 306A it corresponding CSL 208 is connected. For the description of the embodiment, shelf controller 314A communicates with ICON management card 304A. Shelf controller 314B is connected to active control card 302A through CSL 208, ICON I/O card 306B and one of ICON management cards 304A or 304B. Since shelf controller 312A communicates with ICON management card 304A, switch 108 is configured so that shelf controller 312B communicates with its pair, ICON management card 304B. Shelf controllers 314A and 314B are also connected to one another by mate link 324. Mate link 324 facilitates communication between shelf controllers 314A and 314B within I/O shelf 204B.

Switching shelves 200 are also connected to control shelf 202. In the embodiment, switching shelves 200 have one shelf controller 316 each performing control functions for its switching shelf 200. Shelf controller 316 is connected to active control card 302A through two CSLs 208, ICON I/O cards 306A and 306B and both ICON management cards 304A and 304B.

Figure 4:
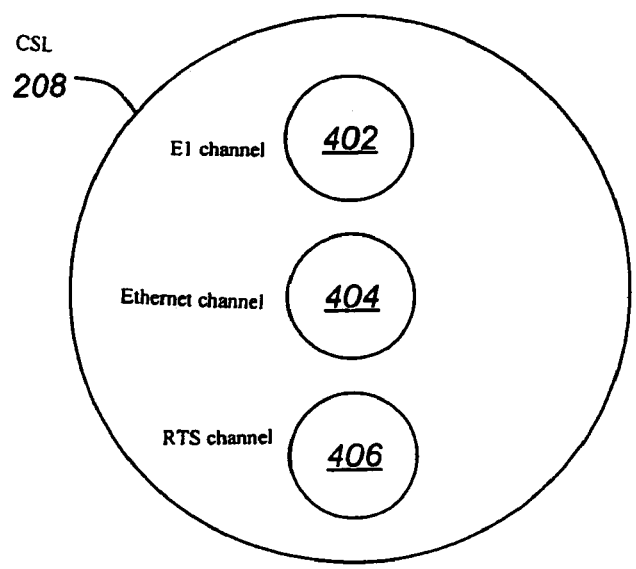
FIG. 4 is a block diagram of control service links of the routing switch of FIG. 2.

Referring to FIG. 4, in the embodiment, CSLs 208 comprise three separate channels which are bundled into one physical cable. The first channel, E1 channel 402, is a time division multiplexing (TDM) channel. E1 channel 402 is used to transmit time sensitive information and system synchronization information between control shelf 202 and shelf controllers 312A, 312B, 314A, 314B and 316. Information provided on E1 channel 402 informs control shelf 202 which of shelf controllers 312 and 314 is active. The second channel, Ethernet channel 404, is a full duplex messaging channel for general communications to every shelf in switch 108. The signals transmitted therein may include connection information, software downloading, debugging, alarm management and configuration transfers. Ethernet channel 404 transmits categories of communication between control shelf 202 and shelf controllers 312A, 312B, 314A, 314B and 316 that does not travel over E1 channel 402. Transmission over Ethernet channel 404 only occurs if there is data to transmit, otherwise the channel is silent. The third channel, Real Time Stamp (RTS) channel 406, is a simplex differential channel used to transmit time alignment signals to all the elements of switch 108. This provides the same timestamp to all elements which may be useful for debugging and billing purposes.

Poor transmission or reception of signals on a CSL 208 could affect the system's performance because information must be retransmitted. CSLs 208 could also break or be removed. Therefore the a pair of redundant CSLs 208 are provided connecting each of I/O shelves 204 and switching shelves 200 to control shelf 202. Switch 108 monitors the relative health of the two redundant CSLs 208 connecting each I/O shelf 204 and switching shelf 200 with control shelf 202 and chooses a CSL 208 to be the active or primary link. Switch 108 then routes all traffic for the redundant pair of CSLs 208 over active CSL 208. The other CSL 208 is the redundant link which is used to send ancillary information and does not send a duplicate set of traffic which travels on the active link. Switch 108 continues to monitor redundant CSL 208 and will switch between the active and redundant CSLs 208 if the relative health of CSLs 208 indicate that such a switch is desirable.

Referring again to FIG. 3, ICON management cards 304 are programmed to execute CSL tasks 320A and 320B to monitor the relative health of their connected CSLs 208. CSL tasks 320C, 320D, 320E, 320F and 320G corresponding to CSL tasks 320A and 320B execute on shelf controllers 312A, 312B, 314A, 314B and 316 respectively. For a pair of shelf controllers 312 in I/O shelf 204A, CSL task 320C corresponds to one of CSL tasks 320A or 320B, for the description of the embodiment CSL task 320A. CSL task 320D then corresponds to the other CSL task, CSL task 320B. Which CSL task 320A or 320B corresponds to shelf controller 312A depends on which ICON management card 304A or 304B communicates with shelf controller 312A. Similarly, CSL tasks 320E and 320F correspond to a different one of CSL tasks 320A and 320B. For the description of the embodiment, CSL tasks 320C and 320E correspond to CSL task 320A and CSL tasks 320D and 320F correspond to CSL task 320B. For shelf controllers 316 on switching shelves 200, CSL task 320G corresponds to both CSL tasks 320A and 320B since data from one CSL 208 is routed through ICON management card 304A and data from the other CSL 208 is routed through ICON management card 304B.

CSL tasks 320 monitor both the status and the quality of transmissions received on CSLs 208. For shelf controller 312A and its corresponding CSL 208 on I/O shelf 204A, CSL tasks 320A and 320C monitor the quality and status of transmissions received on E1 channel 402 and Ethernet channel 404 and the status of RTS channel 406. CSL task 320A transmits its quality monitoring information to CSL task 320C over CSL 208. CSL task 320C reports to shelf controller redundancy task 322A the aggregate of its own information and that of CSL task 320A on the quality and status of transmissions received on E1 channel 402 and Ethernet channel 404 and the status of RTS channel 406. It will be appreciated that other embodiments may also monitor the quality of RTS channel 406. CSL task 320C also transmits quality information to CSL task 320A over CSL 208 to allow CSL task 320A to raise proper alarms. Similarly, for shelf controllers 312B, 314A and 314B, CSL task 320D reports its information and that of CSL task 320B to shelf controller redundancy task 322B, CSL task 320E reports its information and that of CSL task 320A to shelf controller redundancy task 322C and CSL task 320F reports its information and that of CSL task 320B to shelf controller redundancy task 322D. CSL tasks 320D–F also transmit their quality information to their corresponding CSL task 320A or 320B to raise proper alarms. CSL tasks 320C–F also monitor the status and quality of transmissions received on shelf controllers 312 and 314 and report to their corresponding shelf controller redundancy tasks 322. A local error that occurs on a shelf controller 312 or 314 is considered to occur on its corresponding CSL 208 since the local error will be transmitted across the corresponding CSL 208.

For switching shelves 200, CSL tasks 320A, 320B and 320G monitor the quality and status of transmissions received on E1 channel 402 and Ethernet channel 404 and the status of RTS channel 406. CSL tasks 320A and 320B report their quality information to CSL task 320G. CSL task 320G reports the aggregate of its information and that of CSL tasks 320A and 320B to CSL redundancy task 323. CSL task 320G also report to CSL tasks 320A and 320B to allow these tasks to raise proper alarms. Since switching shelves 200 have only one shelf controller 316 each, it is not possible to switch from shelf controller 316. Switching shelves 200 instead switch between CSLs 208.

E1 channels 402 in both active and redundant CSLs 208 connected to an I/O shelf 204 or switching shelf 200 are monitored for errors in their transmissions. CSL tasks 320 corresponding to the active and redundant CSLs 208 track the total number of errors received in their transmissions and the number of frames successfully received for E1 channels 402 during a given time interval. These numbers and the type and severity of these errors are used to determine the quality of E1 channels 402.

Ethernet channels 404 in both active and redundant CSLs 208 connected to an I/O shelf 204 or switching shelf 200 are also monitored for errors in their transmissions. However, in the embodiment, transmission over Ethernet channel 404 only occurs if there is data to transmit. Typically there is minimal traffic sent over Ethernet channel 404 in redundant CSL 208. Accordingly, to provide a statistical foundation for monitoring traffic of transmission in the redundant CSL 208, CSL tasks 320 generate dummy traffic and transmit the dummy traffic over both the active and redundant CSLs 208. Ethernet channels 404 carry their regular traffic and the generated dummy traffic. Transmission of dummy traffic is periodic, occurring every 100 ms in the embodiment, to avoid wasting bandwidth on CSL links 208 and to avoid using too much processing power on ICON management cards 304. The quality of transmissions on Ethernet channel 404 is then calculated based on the percentage of errors sent and received, the percentage of frames successfully sent and received and the type and severity of these errors for Ethernet channels 404 during a given time interval. It will be appreciated that other algorithms for tracking errors on Ethernet channels 404 may be used to provide quality tests for CSLs 208.

RTS channels 406 in both active and redundant CSLs 208 connected to an I/O shelf 204 or switching shelf 200 are similarly monitored for their status. In the embodiment, a non-functioning RTS channel 406 is considered less severe than some E1 or Ethernet channel errors since it does not affect availability of switch 108.

Figure 5:
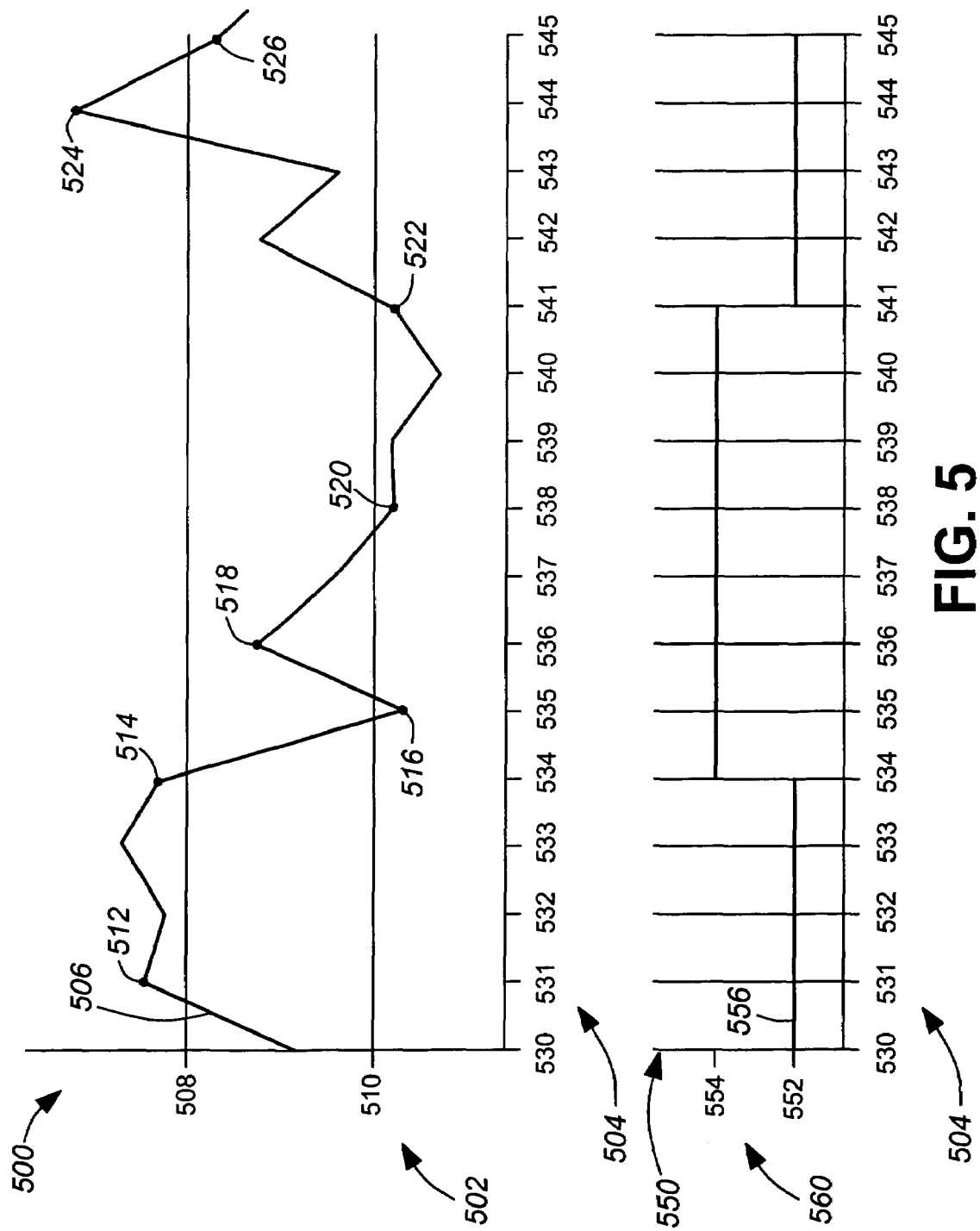
FIG. 5 is a graph illustrating the quality and status of a channel of the control service links in an exemplary operation of FIG. 4.

For E1 channel 402 and Ethernet channel 404, the quality of each channel is represented by a calculated error percentage. In the embodiment, the error percentage for E1 channel 402 is calculated as the number of receive errors reported divided by the number of good frames received in a time interval. These statistics are gathered by shelf controller redundancy tasks 322 and CSL redundancy tasks 323. The error percentage is calculated at the end of a time interval for the previous time interval. Referring to FIG. 5, graph 500 shows the error percentage along axis 502 and time intervals are marked along axis 504. Plot 506 shows the change in the percentage of errors over time for an E1 channel 402. If E1 channel 402 remains above an upper threshold 508 of error percentage for three consecutive time intervals, E1 channel 402 has an "errored" status. Similarly, if E1 channel 402 remains below a lower threshold 510 of error percentage for three consecutive time intervals, its status is considered "good". This provides a debounce mechanism for the calculated error percentage to reduce the effect of spurious "good" or "bad" signals. It will be appreciated that upper threshold 508 is a larger error percentage than lower threshold 510. The status of E1 channel 402 does not otherwise change between "good" and "errored". It will be appreciated that "good" status and "errored" status are states within a general "up" status for E1 channel 402.

Graph 550 follows plot 556 indicating the status of E1 channel 402 over the same time intervals as graph 500. Graph 550 has the same time axis 504 as graph 500. "Good" status for E1 channel 402 is shown by good status 552 marked along the y axis 560 of graph 550 and "errored" status is shown by errored status 554. E1 channel 402 begins at good status 552 at time 530 indicated by plot 556 on graph 550. Point 512 on plot 506 of graph 500 shows that the error percentage of E1 channel 402 has risen above upper threshold 508 at time 531. E1 channel 402 remains above upper threshold 508 at point 514 at time 534. Since E1 channel 402 has remained above upper threshold 508 for three consecutive time intervals, its status is changed to "errored". This is indicated on plot 556 which changes to errored status 554 on graph 550 at time 534.

At point 516 at time 535, plot 506 indicates that the error percentage for E1 channel 402 has fallen below lower threshold 510. However, it rises above lower threshold 510 again at point 518 at time 536. Since the error percentage for E1 channel 402 has not remained below lower threshold 510 for three consecutive time intervals, its status remains unchanged in graph 550. At point 520 at time 538, the error percentage of E1 channel 402 again falls below lower threshold 510 and it remains below at time 541 at point 522. Since E1 channel 402 has remained below lower threshold 510 for three consecutive time intervals, its status is changed to "good". This is indicated on plot 556 in graph 550 which changes to good status 552 at time 541. Plot 506 of graph 500 again rises above upper threshold 510 at point 524 at time 544 but it falls below upper threshold 508 again at point 526 at time 545. Since the elapsed time is less than three time intervals, the status of E1 channel 402 remains unchanged in graph 550.

In the embodiment, the quality for Ethernet channel 404, is measured in both the transmit and receive directions. The error percentage for the receive direction is calculated as the number of errors in received frames or bad frames reported divided by the number of good frames received in a time interval. These statistics are gathered by shelf controller redundancy tasks 322 and CSL redundancy tasks 323. The error percentage for the transmit direction is calculated as the number of transmit errors reported divided by the number of good frames transmitted in a time interval. The error percentage is calculated at the end of a time interval for the previous time interval. Error percentages for both the transmit and receive directions are monitored simultaneously for Ethernet channel 404. If the error percentage of either of the transmit and receive directions falls above upper threshold 508, the error percentage of Ethernet channel 404 is considered to be above upper threshold 508 for this interval. Three consecutive intervals where the error percentage of either of the transmit and receive directions falls above upper threshold 508 results in a change from "good" to "errored" status for Ethernet channel 404. If the error percentage of both of the transmit and receive directions fall below lower threshold 510, the error percentage of Ethernet channel 404 is considered to be below lower threshold 510 for this interval. Therefore, the error percentage of both of the transmit and receive directions must be below lower threshold 510 for three consecutive intervals before the status of Ethernet channel 404 will change from "errored" to "good".

Channels have a third status of "down". If one of E1 channel 402 and Ethernet channel 404 is down then the CSL 208 is considered "down". A channel may be faulty resulting in a "down" status, or a channel may be temporarily "down". A channel may be temporarily "down" if it is connected to shelf controller 312 or 314 which is switched to being the redundant shelf controller. Newly redundant shelf controller 312 or 314 releases activity to its mate, the newly active shelf controller 312 or 314. Newly redundant shelf controller 312 or 314 is reset to cause the switch to be effected. The channels connected to the newly redundant shelf controller 312 or 314 are temporarily "down" until the reset is completed. The quality of transmissions on CSLs 208 and shelf controllers 312 and 314 then continue to be monitored by CSL tasks 320A–F to allow the embodiment to make appropriate switching decisions.

Shelf controller redundancy tasks 322 and CSL redundancy tasks 323 collectively track the quality and the number and types of errors reported and the channels on which they are reported for a pair of redundant CSLs 208. Accordingly, the embodiment provides a system to select between the two links. Switch 108 uses a demerit system to weigh the severity of the errors reported for both CSLs 208, sum the weights and choose between a pair of redundant CSLs 208. The demerit system in different embodiments may weigh certain errors differently causing the different embodiments to switch between the active and redundant CSLs 208 when another weight for errors would not trigger a switch. In the embodiment, the weighting for CSL errors for CSLs 208 connected to switching shelves 200 is given by table 600 of FIG. 6A. The weighting for CSL errors for CSLs 208 connected to I/O shelves 204 is given by table 650 of FIG. 6B. In the embodiment a higher error score represents a higher failure rating for the ranked CSL 208.

Referring to FIG. 6A, in the embodiment, errors 601–608 have been identified which may occur in communicating between control shelf 202 and a switching shelf 200. Errors 601–608 are assigned demerits indicated in column 610 of table 600. Columns 612 and 614 provide short descriptions of the circumstances that give rise to assigning demerits to a CSL 208. It will be appreciated that in other embodiments, other errors may be identified and assigned demerit points and similar errors to errors 601–608 may be assigned different demerits than listed in column 610.

In the embodiment, errors 601–608 are assigned demerits based on a number of rules devised for ensuring an appropriate CSL 208 is chosen as the active CSL 208. Demerits are tracked for each CSL 208 individually. Error 601, having a demerit value 3000, is triggered against a CSL 208 which has an unassigned shelf number. Error 602, having a demerit value 1500, is triggered when the CSL status is "down". Error 603, having a demerit value 750, is triggered when shelf controller 316 cannot communicate with active control card 302A in control shelf 202. Error 604, having a demerit value 300, is triggered when E1 channel 402 has an "errored" status. Error 605, having a demerit value 150, is triggered when Ethernet channel 404 has an "errored" status. Error 606, having a demerit value 100, is triggered when there is a suggestion by components in switch 108 to switch away from a CSL 208, if possible. Error 607, having a demerit value 10, is triggered when RTS channel 406 has a failure. Error 608, having a demerit value 5, is triggered when shelf controller 316 cannot communicate with redundant control card 302B.

Error 601 has a higher demerit value than error 602 since, in the embodiment, a CSL 208 that is "down" is selected as the preferred CSL 208 over a CSL 208 without a shelf number assigned. Error 602 has a higher demerit value than error 603 since, in the embodiment, if active control card 302A is unreachable shelf controller 316 might still be able to communicate with ICON management cards 304A and 304B but, in the case where CSL 208 is "down", then ICON management cards 304A and 304B cannot be reached. Error 603 has a higher demerit value than error 604 since, in the embodiment, active control card 302A can potentially still be reachable over a CSL 208 that is "errored" but not faulted. Error 604 has a higher demerit value than error 605 since, in the embodiment, higher importance is placed on using a CSL 208 with a "good" E1 channel 402 than a CSL 208 with a "bad" E1 channel 402 and a "good" Ethernet channel 402. Error 605 has a higher demerit value than error 606 since, in the embodiment, a lockout on a CSL 208 is just a suggestion to move away from that CSL 208, if possible. It is better to use a good quality link than follow the suggestion to move away from the link. Error 606 has a higher demerit value than error 607 since, in the embodiment, shelf controller 316 can still function properly even if RTS channel 406 fails. Error 607 has a higher demerit value than error 608 since, in the embodiment, any failure or problem is more important than not being able to communicate with the redundant control card 302B. Error 601 has a higher demerit value than errors 602 to 608 combined since, in the embodiment, a CSL 208 without a shelf number assigned is not selected as the preferred CSL 208 unless the other CSL 208 also has that fault.

Referring to FIG. 6B, similar corresponding errors and demerits are set out for CSLs 208 and shelf controllers 312 and 314 for I/O shelves 204 as for the switching shelves 200. The weighted demerit values listed in column 652 of table 650 are assigned to weigh errors detected in I/O shelf 204B. The demerit system used by switching shelves 200 shown in FIG. 6A only tracks errors occurring in relation to CSLs 208. On I/O shelf 204, the weighted demerit values provide a scale of values for errors occurring on shelf controllers 314A and 314B. For example, error 660 assesses 30,000 demerits against a shelf controller 314 if its mate detects that the shelf controller 314 is not present. Demerits against a shelf controller 314 are ultimately assessed against its corresponding CSL 208 since a local error is deemed to be an error on the CSL 208, as mentioned previously. Demerit values are assigned in a similar manner as with switching shelf 200 to trigger switches to or away from CSLs 208 and/or shelf controllers 314 depending on the errors detected. It will be appreciated that a demerit system for other types of I/O shelves 204 may be implemented and administered in a similar manner to the essence of a weighting system as described herein.

Referring again to FIG. 3, mate link 324 provides a communication link between a pair of redundant shelf controllers 312. Shelf controllers 312 therefore can communicate messages with their redundant pair via messages through the link and determine which CSL 208 of the pair has a better relative health. Relative health of CSLs 208 is determined by the demerits accumulated for a CSL 208 and its corresponding shelf controller 312. Shelf controllers 312 themselves determine which shelf controller 312A or 312B and CSLs 208 should be active and switch between shelf controllers 312A and 312B accordingly. Having hardware such as shelf controllers 312 handle this type of switching produces a faster response than a switching system implemented in software. It will be appreciated that shelf controllers 314A and 314B operate in a similar manner to determine which shelf controller 314A and 314B and CSLs 208 should be active and switch between shelf controllers 314A and 314B accordingly. Each shelf controller 316 also, in a manner similar to shelf controllers 312 and 314, determines which CSL 208 of the pair of CSLs 208 connected to each shelf controller 316 should be active and switches between CSLs 208 accordingly.

Fast switching between redundant sources is desirable for the control plane. For the data plane, BELLCORE standards require a switch between redundant data links in less than 60 ms. Because the control plane is separate from the data plane in the embodiment and can switch independently, control plane switching should not interfere with data plane switching, if possible. Interference with data plane switching is minimized if control plane switching occurs in a time significantly less than 60 ms. Hardware switching facilitates this response.

In the embodiment, active and redundant CSLs 208 are compared in I/O shelves 204 by their corresponding active shelf controller redundancy task 322 each time a change in the demerit total for one of both of a redundant pair of CSLs 208 occurs. However, shelf controller redundancy task 322 does not immediately compare the demerits when a change occurs. Shelf controller redundancy task 322 instead waits 10 ms giving the other CSL 208 the opportunity to receive or clear the same fault condition that resulted in the change in the demerit total. Active shelf controller 312, for example shelf controller 312A, ensures that the health of redundant shelf controller 312B is stable before switching between active and redundant shelf controllers 312. If at the end of the 10 ms, the redundant CSL 208 has a lower demerit total than active CSL 208, the active and redundant CSLs 208 will be switched. Additionally, a switch can only occur if the inactive shelf controller 312B, is in sync with active shelf controller 312A and both shelf controllers 312 are present and compatible. When shelf controllers 312A and 312B gain sync, a switch can take place. Shelf controller redundancy tasks 322 manage when to switch between shelf controllers 312A and 312B.

In switching shelves 200, the comparison and management of when to switch between CSLs 208 is performed by CSL redundancy task 323. If two redundant CSLs 208 connected to a switching shelf 200 have similar demerit values, their corresponding shelf controller 316 may switch between CSLs 208 each time the active CSL 208 has a higher demerit total. Repeated switching between which CSL 208 has the higher demerit total could then produce repeated switching between the active and redundant CSLs 208. To counteract this "thrashing" phenomenon, the embodiment limits the number of switches in switching shelf 200 between the active and redundant CSLs 208 to four switches every 15 minutes. If the active CSL 208 is switched four times within 15 minutes, switch 108 must then wait until the 15 minutes have elapsed before switching again. Software on switching shelf 200 tracks the times of the last four switches between active and redundant CSLs 208. If the first switch occurred less than 15 minutes before the current time, the software on switching shelf 200 prevents the switch. Instead, the demerits are recalculated at the end of the 15 minute interval to determine if a switch is necessary. If the switch is necessary, the switch is made and the time of this switch is recorded as the fourth switch. The time of the formerly fourth switch is recorded as the third, the third becomes the second and the second becomes the first. It will be appreciated that a similar method such as that described above may be used to prevent "thrashing" in I/O shelves 204.

Upon startup of switch 108, shelf controllers 312, 314 and 316 must choose the active CSLs 208. Of the channels of CSLs 208, E1 channel 402 is the first to operate. E1 channel 402 passes control information back and forth between control shelf 202 and I/O shelves 204 and switching shelves 200. Between two redundant shelf controllers 312 or 314 in an I/O shelf 204, the first operating shelf controller 312 or 314 is chosen as active. When both shelf controllers 312 or 314 are operational, CSL tasks 320A–F operate to gather statistics on which is the healthier shelf controller and will switch between shelf controllers 312A and 312B or 314A and 314B appropriately. For switching shelves 200, a predetermined CSL 208 is chosen from the redundant pair connected to shelf controller 316 as the first active CSL 208. Thereafter, CSL tasks 320A, 320B and 320G operate to gather statistics on which is the healthier CSL 208 and will switch between them appropriately. Ethernet channel 404 begins to operate after E1 channel 402 is "up". Once the E1 channel 402 is operational, software on switch 108 begins transmissions over Ethernet channel 404.

It is noted that those skilled in the art will appreciate that various modifications of detail may be made to the present embodiment, all of which would come within the scope of the invention.

We claim:

1. A system for selecting an active control path link as a control communication link between a control shelf and a controlled shelf in a multi-shelf network element, said system comprising:
    a first point-to-point control path link connecting said control shelf to said controlled shelf;
    a second point-to-point control path link connecting said control shelf to said controlled shelf;
    an assessment module for assessing health of control signal transmissions sent through each of said first and second control path links; and
    a selection module associated with said assessment module, said selection module for selecting said active control path as either of said first and said second control path links utilizing a health report relating to said first and said second control path link links generated by said assessment module,
    wherein said network element including said network element including said control and controlled shelves and said first and second control path links is located at a single network node.

2. The system as claimed in claim 1, said system further comprising an error monitoring module for detecting control path link transmission errors on said first and said second control path links and to report said control path link transmission errors to said assessment module.

3. The system as claimed in claim 2, wherein said selection module is located in a shelf controller of said multi-shelf network element.

4. The system as claimed in claim 2, said system further comprising:
    a first shelf controller connected to said first control path link; and
    a second shelf controller connected to said second control path link;
    wherein said error monitoring module is for detecting shelf controller transmission errors on said first and said second shelf controllers and to report said shelf controller transmission errors to said assessment module.

5. The system as claimed in claim 4, wherein said selection module comprises said first and said second shelf controllers.

6. The system of claim 1 wherein said network element has a data plane having one or more data paths for transferring data signals and wherein said data paths are separate from said first and second control path links.

7. The system of claim 1 wherein said health report includes a respective sum of demerit points for errors occurring with respect to said control signal transmissions on each of said first and second control path links, each error being assigned a respective number of demerit points based on seriousness of said error.

8. A method for selecting an active control path link as a communication link between a control shelf and a controlled shelf in a multi-shelf network element, said control shelf connected to said controlled shelf by a first point-to-point control path link and a second point-to- point control path link, said method comprising the steps of:

detecting errors present in each of said first and said second control path links;

assessing health of control signal transmissions sent through each of said first and said second control path links based on said errors detected; and selecting the active control path link as one of said first and said second control path links utilizing a health report relating to said health of said first and said second control path links wherein said network element including said control and controlled shelves and said first and second control path links is located at a single network node.

9. The method for selecting an active control path link as claimed in claim 8, wherein said step of selecting said control path link as said active control path link is performed by a selection module.

10. The method for selecting an active control path link as claimed in claim 9, further comprising the step of providing said health report to said selection module.

11. The method for selecting an active control path link as claimed in claim 10, wherein said step of assessing health of transmissions is performed by an assessment module and said assessment module provides said health report to said selection module.

12. The method for selecting an active control path link as claimed in claim 11, wherein said step of detecting errors transmitted is performed by an error detection module.

13. The method for selecting an active control path link as claimed in claim 8, wherein said first control path link is connected to a first shelf controller in said controlled shelf and said second control path link is connected to a second shelf controller in said controlled shelf and said step of detecting errors transmitted detects errors originating from said first and said second shelf controllers.

14. The method of claim 8 wherein said network element has a data plane having one or more data paths for transferring data signals and wherein said data paths are separate from said first and second control path links.

15. The method of claim 8 wherein said health report includes a respective sum of demerit points for errors occurring with respect to said control signal transmissions on each of said first and second control path links, each error being assigned a respective number of demerit points based on seriousness of said error.

16. A multi-shelf network element with redundant control path links, said network element comprising:

a control shelf of said multi-shelf network element;

a controlled shelf of said multi-shelf network element;

a first point-to-point control path link connecting said control shelf with said controlled shelf;

a second point-to-point control path link connecting said control shelf with said controlled shelf; and an assessment module communicating with said first and said second control path links, wherein said assessment module assesses healths of said first and said second control path links and said multi-shelf network element selects an active control path link from said first and said second control path links based on said healths of said first and said second control path links and transmits control signals over said active control path link selected, and wherein said network element including said control and controlled shelves and said first and second control path links is located at a single network node.

17. The multi-shelf network element as claimed in claim 16, said multi-shelf network element further comprising a selection module associated with said assessment module, said selection module for selecting said active control path link.

18. The multi-shelf network element as claimed in claim 17, said multi-shelf network element further comprising an error monitoring module for detecting control path link transmission errors on said first and said second control path links and to report said control path link transmission errors to said assessment module.

19. The multi-shelf network element as claimed in claim 17, wherein said selection module is located in a shelf controller of said multi-shelf network element.

20. The multi-shelf network element as claimed in claim 17, said multi-shelf network element further comprising:

a first shelf controller connected to said first control path link; and a second shelf controller connected to said second control path link, wherein said error monitoring module detects shelf controller transmission errors on said first and said second shelf controllers and reports said shelf controller transmission errors to said assessment module.

21. The multi-shelf network element as claimed in claim 20, wherein said selection module comprises said first and said second shelf controllers.

22. The multi-shelf network element as claimed in claim 21, wherein said network element selects an active control path by comparing said healths and said assessment module assigns weighted health values for each of said healths.

23. The multi-shelf network element as claimed in claim 22, wherein one of said health values represents a condition of the control path links.

24. The multi-shelf network element as claimed in claim 22, wherein one of said health values represents a condition of the controlled shelf.

25. The multi-shelf network element of claim 16 wherein said network element has a data plane having one or more data paths for transferring data signals and wherein said data paths are separate from said first and second control path links.

26. The multi-shelf network element of claim 16 wherein said healths include a respective sum of demerit points for errors occurring with respect to said control signals on each of said first and second control path links, each error being assigned a respective number of demerit points based on seriousness of said error.

* * * * *